United States Patent [19]

Feldhausen et al.

[11] Patent Number: 5,607,608

[45] Date of Patent: Mar. 4, 1997

[54] END CAP CONSTRUCTION FOR ENGINE DRIVEN WELDER

[75] Inventors: Joseph E. Feldhausen; Jeffery P. Schroeder, both of Appleton, Wis.

[73] Assignee: Miller Group Ltd., Appleton, Wis.

[21] Appl. No.: 383,104

[22] Filed: Feb. 3, 1995

[51] Int. Cl.⁶ .................................................. B23K 9/00
[52] U.S. Cl. .................................... 219/133; D13/114
[58] Field of Search ................................. 219/133, 134; 290/1 A, 1 B, 1 R; D13/114

[56] References Cited

PUBLICATIONS

Owner's Manual Form OM-131OD (Jan. 1995) for the Millermatic® 150 and GA-17C Gun.

*Primary Examiner*—Clifford C. Shaw
*Attorney, Agent, or Firm*—Mark W. Croll; Thomas W. Buckman; John P. O'Brien

[57] ABSTRACT

At end cap construction forms part of an enclosure for a self-contained welding machine. The end cap construction comprises a control panel assembled to the back plane of an upright bezel. Triangular-shaped arms on the bezel fit into a corresponding triangular-shaped outline of the panel to add rigidity to the panel. The bezel has appreciable thickness between its back plane and a front plane. Control knobs on the control panel front surface are recessed from the bezel front plane and are thus protected by the bezel against damage. The bezel and panel have respective flanges that are fastened to top and side covers that complete the enclosure.

21 Claims, 4 Drawing Sheets

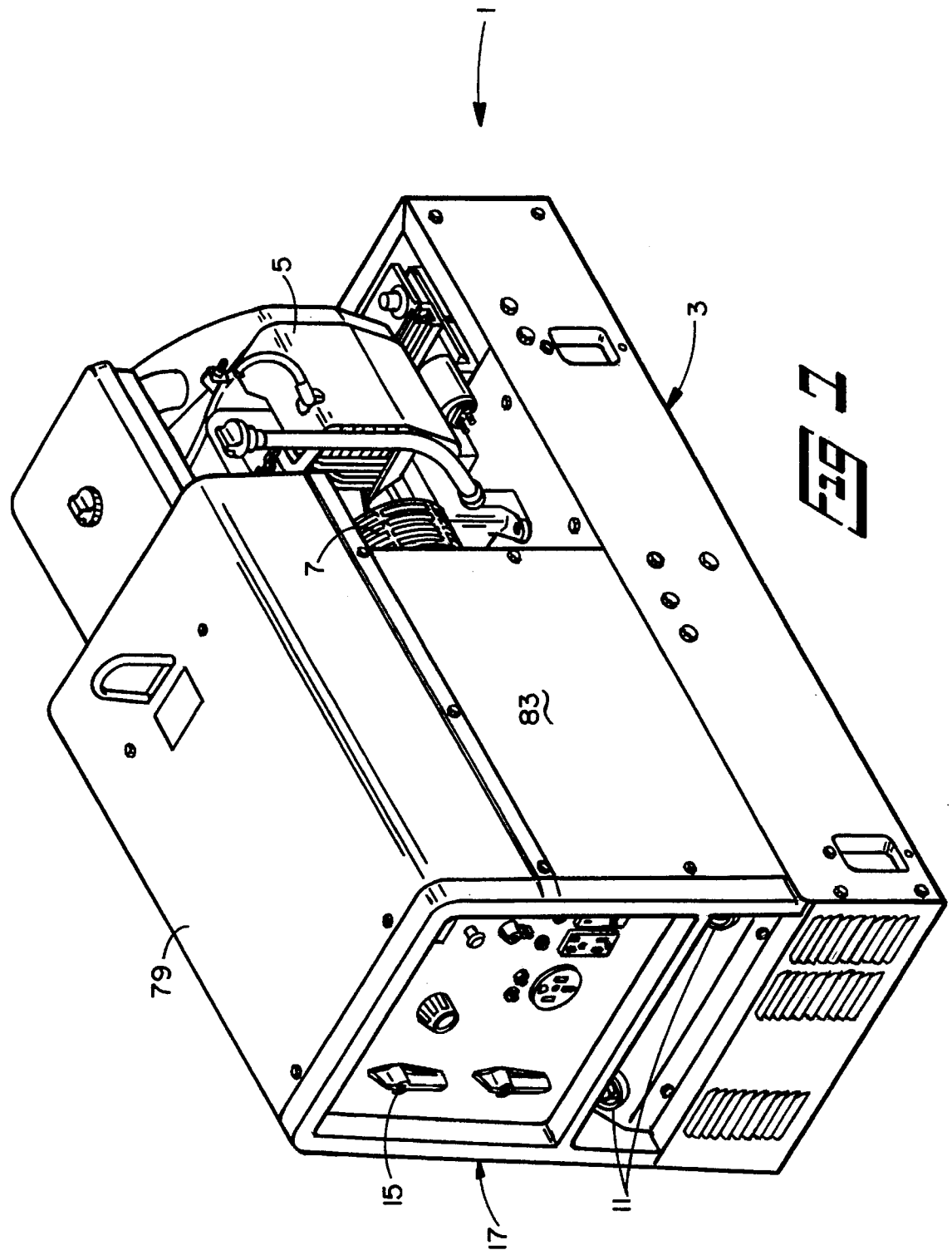

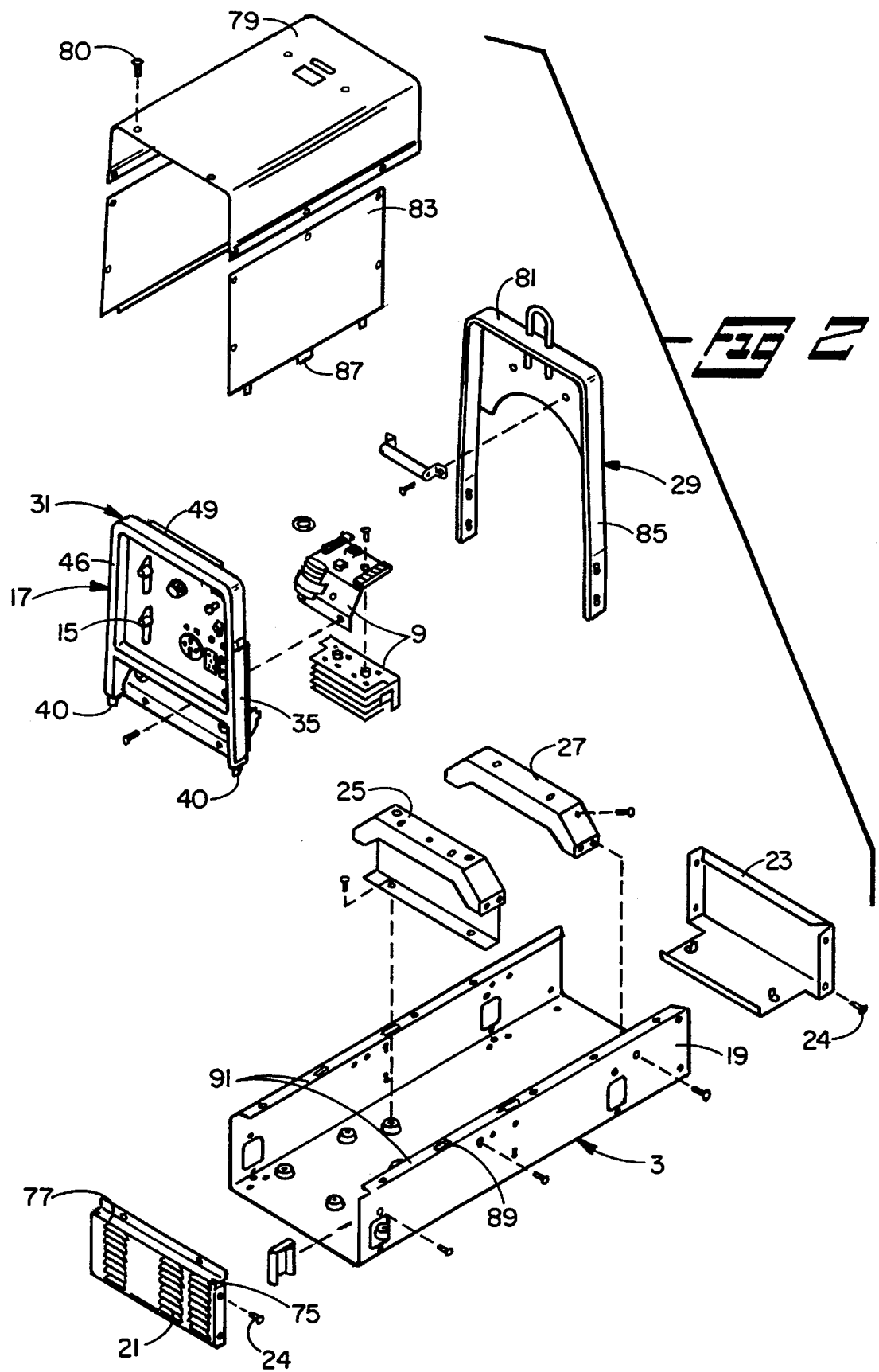

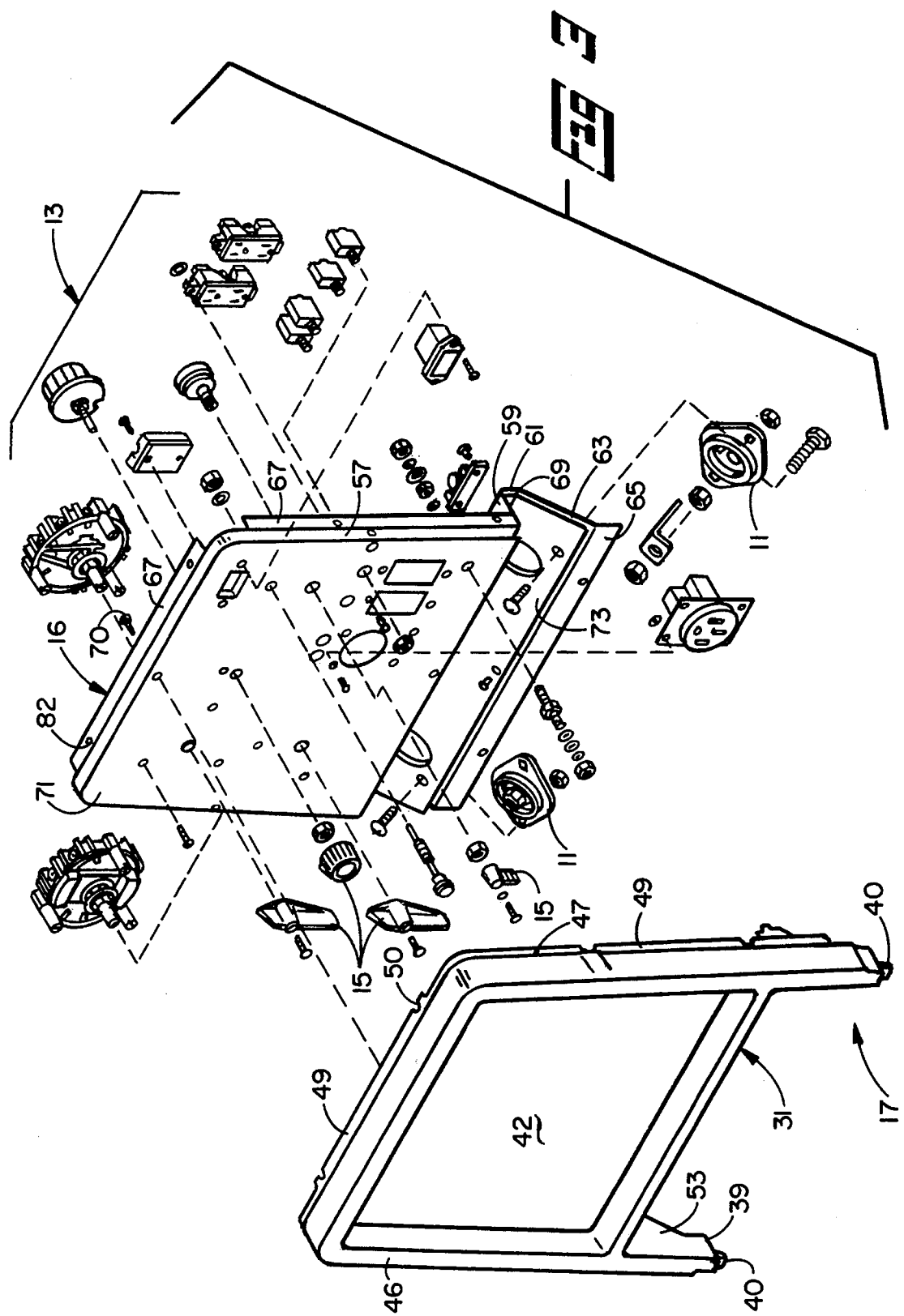

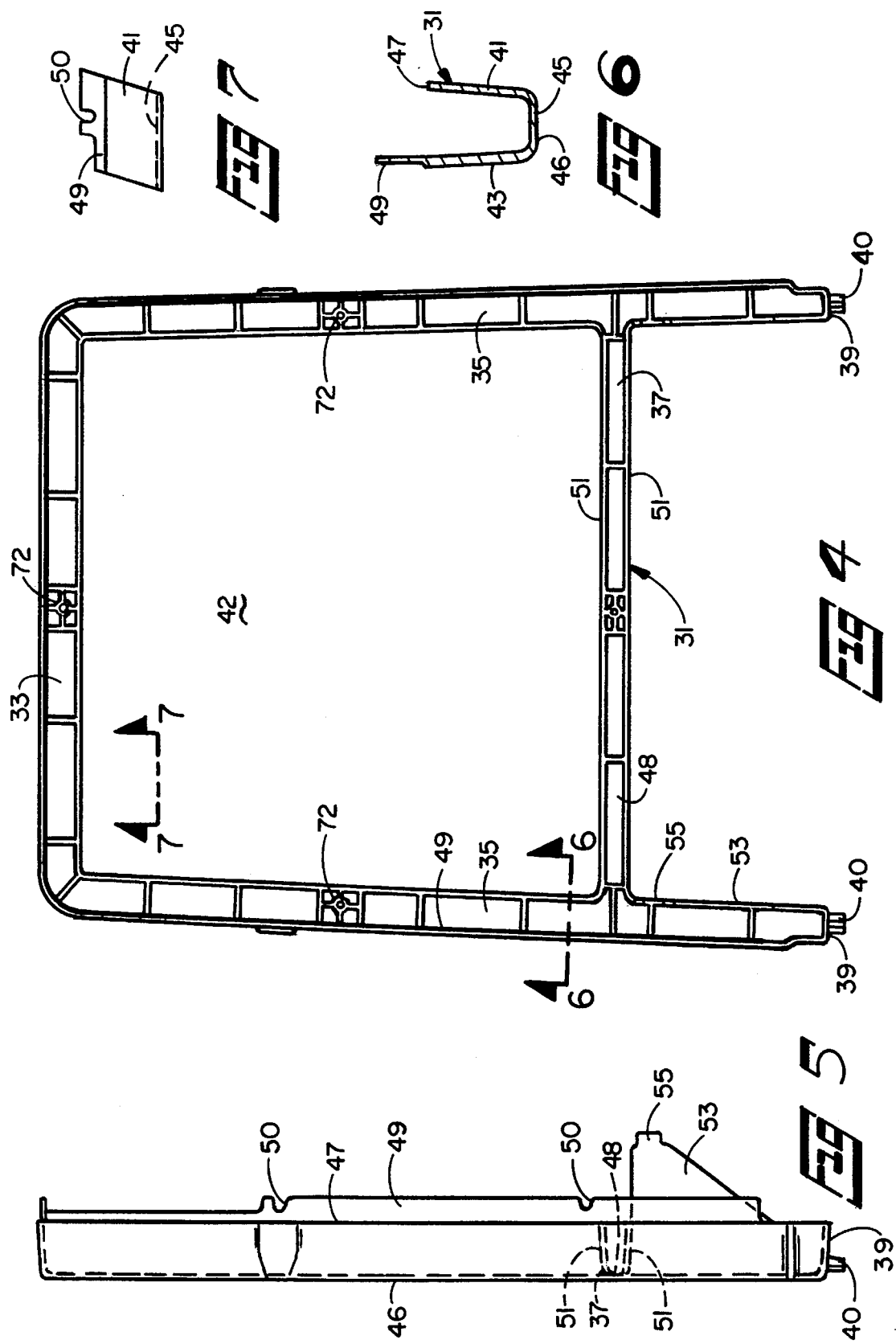

END CAP CONSTRUCTION FOR ENGINE DRIVEN WELDER

BACKGROUND OF THE INVENTION

1. Field of the Invention

This invention pertains to welding machines, and more particularly to the protection of welding machine controls.

2. Description of the Prior Art

Self-contained welding machines are well known. Such machines include a frame to which a prime mover and a generator are mounted. The generator produces electrical power that is converted by various electro-magnetic devices into power suitable for welding purposes. The welding power is typically available at a pair of terminals on the machine. The generator and electro-magnetic devices are covered by a protective enclosure.

To operate the welding machine, that is, to make the proper welding power available at the terminals, the welding machine is equipped with several controls in the form of selector switches, rheostats, polarity switches, and similar components. The controls are typically mounted on the inside of a control panel that forms part of the protective enclosure. Hand knobs and handles located on the outside of the control panel connect to the various controls and enable a person to operate the machine.

Self-contained welding machines are frequently used in adverse conditions, so they must be ruggedly built. It is particularly important that the machine control knobs be protected from accidental bumping that might damage them or upset the machine operation. In many prior machines, the control panel formed an outermost plane of the protective enclosure. Consequently, the control knobs protruded into space outside of the protective enclosure. At such locations, the knobs were prone to being damaged. Further, the prior protective enclosure, including the control panel, did not present a particularly attractive appearance.

Static welding machines, i.e., welding machines that obtain their electrical power from a central source, are usually smaller and less ruggedly built than self-contained welding machines. In addition, the welding gun cables of static welding machines are dedicated to the machine so the operator need not attach the cables to nor remove them from the machine. Consequently, the safety factor associated with the cables is less acute than with self-contained welding machines. In some prior static machines, the control panel is recessed.

It is considered desirable to incorporate some of the features of static welding machines into self-contained welding machines while at the same time improving the safety of self-contained welding machines.

SUMMARY OF THE INVENTION

In accordance with the present invention, an end cap construction is provided that greatly improves the protection of the controls of self-contained welding machines. This is accomplished by recessing a control panel inside an attractive and rugged bezel.

The bezel has a top leg and two side legs. A cross bar connects the two side legs near their free ends. The top leg, cross bar, and side legs define a window. The free ends of the side legs terminate in respective tabs. In cross section, the bezel legs and cross bar are generally U-shaped, each having a middle wall, an outside wall, and an inside wall. The middle walls of the legs and cross bar are coplanar, and they define a front plane of the bezel. The free ends of the outside and inside walls of the legs and cross bar are coplanar and define a back plane. There is a substantial depth between the front and back planes.

The bezel further has flanges that extend from the outside walls of the top and side legs past the back plane. A pair of triangular-shaped arms are formed on the inside walls of the two side legs between their respective free ends and the cross bar. The arms are perpendicular to and extend beyond the back plane.

Various controls are mounted to the back surface of an upper area of the control panel. Control knobs and handles on the front of the panel pass through holes in the panel to connect with the controls. The panel has a portion with a triangular-shaped outline. A lower area of the panel is coplanar with the upper area. Top and side flanges extend from the upper area in the direction of the panel back subface.

The control panel is assembled to the bezel back plane to create the end cap. The panel upper area covers the bezel window. The panel portion with the triangular-shaped outline receives the bezel arms. The lower area of the panel lies against the bezel back plane proximate the free ends of the bezel side legs. The panel top and side flanges fit closely inside the flanges on the bezel top and side legs, respectively. The control knobs lie between the bezel front and back planes.

A top cover lies horizontally between the end cap and an upright member located approximately at the center of the welding machine. The bezel flange along its top leg is sandwiched between the top flange of the control panel and the top cover. A pair of vertical side covers also extend from the end cap to the upright member. The bezel flanges along its side legs are sandwiched between the side flanges of the panel and the side covers. Fasteners join the panel, bezel and covers to each other, and the covers to the upright member, in a manner that creates a rugged but attractive enclosure. In addition, the control knobs are recessed from the front plane of the bezel and thus are protected from accidental bumping.

Other advantages, benefits and features of the present invention will become apparent to those skilled in the art upon reading the detailed description of the invention.

BRIEF DESCRIPTION OF THE DRAWINGS

FIG. 1 is a perspective view of a self-contained welding machine that includes the present invention.

FIG. 2 is an exploded perspective view of selected components of the self-contained welding machine including the end cap construction of the invention.

FIG. 3 is an exploded perspective view of the end cap construction and selected controls.

FIG. 4 is a back view Of the bezel of the invention.

FIG. 5 is a side view of FIG. 4.

FIG. 6 is a cross sectional view taken along line 6—6 of FIG. 4.

FIG. 7 is a view taken along line 7—7 of FIG. 4.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIG. 1, a self-contained welding machine 1 is illustrated that includes the present invention. The welding machine 1 is comprised of a frame 3 on which are supported a prime mover 5 that drives an electrical generator 7. Electricity produced by the generator 7 is converted by various electrical devices, not shown in FIG. 1, into usable welding power available at terminals 11.

Looking also at FIG. 2, the welding machine frame 3 includes a base 19. Front and back end walls 21 and 23, respectively, are attached to the base 19 by fasteners 24. Brackets 25 and 27 fastened to the base 19 support the generator 7 and prime mover 5, respectively. An upright member 29 is joined to the base midway between the end walls 21 and 23. The electrical devices, collectively represented at reference numeral 9 in FIG. 2, are also supported on the base.

The welding machine 1 is operated to a great extent by various rheostats, switches and similar controls collectively represented by reference numeral 13 in FIG. 3. The controls 13 are electrically connected to the electrical devices 9, FIG. 2. The controls are mechanically mounted to the back surface of a vertical panel 16. The shafts of various knobs and levers 15 pass through holes in the panel 16 and connect to corresponding controls 13. The knobs and levers 15 enable manual adjustment and setting of the controls 13 to operate the welding machine 1.

In accordance with the present invention, the panel 16 is incorporated into an end cap 17 that provides both a pleasing appearance to the welding machine 1 and a safeguard for the knobs 15 associated with the controls 13. In addition to the panel 16, the end cap 17 includes a bezel 31. The bezel is preferably made from a high impact-constant thermoplastic material that is non-electrical conducting. As best shown in FIG. 4, the bezel 31 has an inverted U-shape with a top leg 33 and two side legs 35. The side legs 35 preferably converge slightly toward the top leg 33. A cross bar 37 is joined to the side legs 35 approximately three-fourths of the distance between the top leg 33 and the free ends 39 of the side legs 35. The top leg, cross bar 37, and side legs between the top leg 33 and the cross bar define a window 42. The free ends 39 of the side legs terminate in respective T-shaped tabs 40.

In cross section, the bezel top leg 33, side legs 35, and cross bar 37 are generally U-shaped with a substantially hollow interior interrupted by strengthening ribs, FIGS. 5 and 6. The bezel legs have inside and outside walls 41 and 43, respectively, and middle walls 45. The middle walls 45 are coplanar and define a front plane 46 of the bezel 31. The walls 41 and 43 terminate in respective free ends that are coplanar and that define a back plane 47. To protect the knobs 15 in some applications, the distance between the front plane 46 and the back plane 47 is preferably at least approximately 1.50 inches. It will be appreciated, or course, that a lesser distance can be used and still fall within the scope of the invention if smaller knobs are used. The bezel with a lesser distance between the front and back planes is designed and constructed with adequate structural strength. The cross bar 37 has side walls 51 that terminate at the back plane 47. The front wall 48 of the cross bar is coplanar with the middle walls 45 of the top and side legs.

A flange 49 extends from the outside walls 43 of the top and side legs 33 and 35, respectively, past the back plane 47. There is at least one and preferably two or more notches 50 in the flange 49 around each of the top and side legs. Also see FIG. 7.

The bezel is further formed with a generally triangular-shaped arm 53 on each side leg 35 between its free end 39 and the cross bar 37. The arms 53 are integral with the inside walls 41 of the side legs, and they extend perpendicular to and past the back plane 47. Each arm terminates in a tab 55.

Returning to the panel 16, FIG. 3, it is fabricated from a thin blank of material that is bent along several fold lines to produce the finished panel. The panel has a relatively large upper area 57 that is bounded at its lower end by a short ledge 59. The ledge 59 ends in a short back section 61 that in turn blends into an angled section 63. The angled section 63 ends at a bottom area 65 that is coplanar with the upper area 57. The ledge 59, back section 61, and angled section 63 cooperate to define a triangular-shaped outline. The panel further includes flanges 67 along the top and sides of the upper area 57 that extend toward a panel back surface.

A large name plate 71 is placed over the front surface of the panel upper area 57. A smaller name plate 73 is placed over the panel angled section 63. The various controls 13 are mounted to the back surface of the panel 16. Holes through the name plate 71 and the panel upper area enable the knobs and levers 15 to connect to the shafts of the various controls. The welding power output terminals 11 are mounted to the panel angled section 63 and pass through holes in that section and in the name plate 73.

The completed panel 16 is assembled to the bezel 31 with the name plate 71 in facing contact with the bezel back plane 47. The panel upper area 57 and the name plate 71 cover the bezel window 42. The bezel arms 53 fit into the panel triangular-shaped outline bounded by the panel ledge 59, back section 61, and angled section 63. The arm tabs 55 (FIG. 5) register with corresponding slots 69 in the panel back section, thereby providing rigidity to the bezel arms. The panel flanges 67 fit inside the corresponding bezel flanges 49 to further contribute to the rigidity of the panel. Self-tapping screws 70 passing through the panel and threaded into associated holes 72 in the bezel (FIG. 4) complete the assembly of the panel to the bezel.

The depth of the bezel 31 between its front plane 46 and back plane 47 is greater than the thickness of the control knobs and levers 15. Consequently, the knobs and levers are recessed relative to the bezel front plane. The result is the rigid and attractive end cap 17.

An important advantage of the end cap 17 is that the bezel cross bar 37 provides protection and rigidity to the area of the panel 16 adjacent the welding terminals 11. The bezel therefore afford mechanical protection to the terminals as workers attach welding cables to and remove them from the terminals. The non-conducting material of the bezel assure that electrical wires near the terminals do not get shorted on it. In addition, the non-conducting bezel enables the terminals to be separated at an increased distance from each other compared to prior machines, thereby making the terminals safer to use.

The end cap 17 is assembled to the rest of the welding machine 1 by placing the bezel T-shaped tabs 40 into associated slots 75 in a top flange 77 of the front wall 21, FIGS. 1 and 2. A top cover 79 is placed over the flange 49 of the top leg 33 of the bezel 31. Screws 80 passing through the top cover 79, slots 50 in the bezel top flange 49, and holes 82 in the panel flange 67 assemble together the sandwich construction of the top cover 79, bezel flange 49, and panel flange 67. The top cover is also placed over a top surface 81 of the upright member 29. A pair of side covers 83 are placed over and fastened to the flanges of the bezel side legs 35 and the panel side flanges, and to side surfaces 85 of the upright member. Tabs 87 at the bottom edges of the side covers 83 enter corresponding slots 89 in horizontal flanges 91 of the base 19.

The end cap 17 provides a recessed location for the knobs and levers 15 relative to the bezel front plane 46 and thus protects them from accidental damage. The self-contained welding machine 1 with the end cap has a very sturdy construction for the panel 16 and covers 79 and 83. The end cap also contributes to the neat and attractive appearance of the welding machine.

Thus, it is apparent that there has been provided, in accordance with the invention an end cap construction that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A self-contained welding machine comprising:
   a. a prime mover;
   b. electrical means rotated by the prime mover for producing welding power;
   c. frame means for supporting the electrical means;
   d. an end cap assembled to the frame means comprising:
      i. a bezel having a top leg, side legs assembled to the frame means, and a cross bar joined to the side legs, the bezel defining spaced apart front and back planes, the bezel top and side legs and cross bar having respective U-shaped cross sections each having a middle wall and inside and outside walls, the middle walls of the top and side legs and of the cross bar defining the bezel front plane, the inside and outside walls of the top and side legs and of the cross bar terminating in respective flat surfaces that are coplanar and that define the bezel back plane, and the outside walls of the bezel top and side legs being formed with respective flanges thereon that extend past the bezel back plane,
      ii. a panel having a front surface assembled to the bezel back plane and a back surface, the panel defining a plurality of holes therethrough;
   e. control means mounted to the panel back surface for controlling the electrical means;
   f. knob means lying between the bezel front and back planes for connecting to the control means through the holes in the panel to adjustably operate the control means; and
   g. cover means assembled to the bezel, panel, and frame means for cooperating therewith to provide an enclosure for the control means and a predetermined portion of the electrical means,
   so that the knob means are recessed from the bezel front panel to protect them against damage.

2. The self-contained welding machine of claim 1 wherein the inside walls of the bezel side legs between the free ends thereof and the cross bar are formed with respective generally triangular-shaped arms that extend past the bezel back plane.

3. The self-contained welding machine of claim 2 wherein the panel is fabricated with a triangular-shaped outline that receives the triangular-shaped arms of the bezel when the panel is assembled to the bezel.

4. The self-contained welding machine of claim 3 wherein the bezel triangular-shaped arms have respective tabs thereon that register with respective slots in the panel to thereby impart rigidity to the bezel triangular-shaped arms.

5. The self-contained welding machine of claim 2 wherein:
   a. the bezel top leg, cross bar, and side legs between the top leg and the cross bar define a window;
   b. the panel is fabricated with an upper area that covers the bezel window when the panel is assembled to the bezel; and
   c. the panel is fabricated with a triangular-shaped outline that receives the triangular-shaped arms of the bezel when the panel is assembled to the bezel to thereby provide rigidity to the bezel triangular-shaped arms.

6. The self-contained welding machine of claim 1 wherein:
   a. the free end of each bezel side leg terminates in a respective tab; and
   b. the frame means defines a pair of slots that receive the tabs of the bezel side legs for assembling the bezel to the frame means.

7. The self-contained welding machine of claim 1 wherein the panel is fabricated with flanges that lie adjacent associated flanges on the bezel top and side legs.

8. The self-contained welding machine of claim 7 wherein:
   a. the cover means comprises top and side covers having respective front ends; and
   b. the top and side covers are assembled at their respective front ends to the flanges of the bezel and to the panel flanges with the bezel flanges being sandwiched between the covers and the panel flanges.

9. The self-contained welding machine of claim 1 wherein the bezel front and back planes are at least approximately 1.50 inches apart to thereby provide ample protection against damage to the knob means.

10. The self-contained welding machine of claim 1 wherein the bezel is constructed from a high impact-resistant thermoplastic material that is non-electrical conducting.

11. An end cap construction for an engine driven welding machine comprising a bezel having top and side legs and a cross bar joined to the side legs, the bezel defining front and back planes, a panel assembled to the bezel, the panel having a back surface for mounting selected controls thereto and a front surface in contact with the bezel back plane, the bezel front and back planes being at least approximately 1.5 inches apart to thereby provide protection to selected control knobs located adjacent the panel front surface and connected by respective control knob shafts to the controls mounted to the panel back surface, the bezel top and side legs and cross bar have respective U-shaped cross sections each having a middle wall and inside and outside walls, the middle walls of the top and side legs and of the cross bar being coplanar and defining the bezel front plane, the inside and outside walls of the top and side legs and of the cross bar terminating in respective flat surfaces that are coplanar and that define the bezel back plane, the outside walls of the bezel top and side legs being formed with respective flanges thereon that extend past the bezel back plane, and the panel being fabricated with flanges that lie adjacent associated flanges on the bezel top and side legs.

12. The end cap construction of claim 11 wherein the inside walls of the bezel side legs between the free ends thereof and the cross bar are formed with respective generally triangular-shaped arms that extend past the bezel back plane.

13. The end cap construction of claim 12 wherein:
 a. the panel is fabricated with a triangular-shaped outline that receives the triangular-shaped arms of the bezel; and
 b. the bezel triangular-shaped arms have respective tabs thereon that register with respective slots in the panel to thereby impart rigidity to the bezel triangular-shaped arms.

14. The end cap construction of claim 12 wherein:
 a. the bezel top leg, cross bar, and side legs between the top leg and the cross bar define a window;
 b. the panel is fabricated with an upper area that covers the bezel window; and
 c. the panel is fabricated with a triangular-shaped outline that receives the triangular-shaped arms of the bezel to thereby provide rigidity to the bezel triangular-shaped arms.

15. A bezel useful for forming part of an enclosure of a welding machine comprising:
 a. a top leg having opposed ends and a generally U-shaped cross section with a middle wall and inside and outside walls;
 b. a pair of side legs each having a first end joined to a respective end of the top leg and a free end, each side leg having a generally U-shaped cross section with a middle wall and inside and outside walls that join to the middle wall and inside and outside walls, respectively, of the top leg; and
 c. a cross bar extending between and joined to the side legs and having a generally U-shaped cross section with a middle wall and inside and outside walls that join to the middle wall and inside and outside walls, respectively, of the side legs, the cross bar cooperating with the top and side legs to define a window, the middle walls of the top and side legs and of the cross bar defining a front plane of the bezel, the inside and outside walls of the top and side legs and of the cross bar terminating in a back plane of the bezel; and,
 d. the outside walls of the bezel top and side legs being formed with respective flanges thereon that extend past the bezel back plane.

16. The bezel of claim 15 wherein the inside walls of the bezel side legs between the respective free ends thereof and the cross bar are formed with respective generally triangular-shaped arms that extend past the bezel back plane.

17. The bezel of claim 15 wherein the side legs have respective free ends that terminate in tabs that are receivable by a selected member of the welding machine for assembling the bezel thereto.

18. The bezel of claim 15 wherein the bezel front and back planes are at least approximately 1.50 inches apart to thereby protect selected control knobs of the welding machine that lie between the bezel front and back planes.

19. The bezel of claim 15 wherein the side legs are substantially straight and converge uniformly in the direction of the top leg.

20. A method of protecting control knobs of a welding machine comprising the steps of:
 a. providing a panel having front and back surfaces and a triangular-shaped outline;
 b. mounting selected controls to the panel back surface;
 c. locating knobs associated with he controls proximate the panel front surface and connecting the knobs to the associated controls;
 d. providing a bezel having top and side legs and a cross bar joined to the side legs and defining spaced apart front and back planes, said bezel further comprising a pair of triangular-shaped arms extending from respective side legs thereof past the bezel back plane; and
 e. assembling the panel front surface to the bezel back plane by fitting the arms of the bezel into the triangular-shaped outline in the panel and protectively locating the knobs between the bezel front and back planes.

21. The method of claim 20 wherein:
 a. the step of providing a panel comprises the step of providing a panel with flanges extending therefrom in the direction of the panel back surface;
 b. the step of providing a bezel comprises the step of providing a bezel with flanges thereon that extend past the back frame; and
 c. the step of assembling the panel to the bezel comprises the steps of placing the panel flanges in close proximity to corresponding bezel flanges, and assembling the panel flanges to the bezel flanges.

* * * * *